(12) United States Patent  
Choi

(10) Patent No.: US 6,867,961 B2  
(45) Date of Patent: Mar. 15, 2005

(54) PORTABLE COMPUTER

(75) Inventor: Phil-kyu Choi, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 77 days.

(21) Appl. No.: 10/209,098

(22) Filed: Aug. 1, 2002

(65) Prior Publication Data

US 2003/0193773 A1 Oct. 16, 2003

(30) Foreign Application Priority Data

Apr. 12, 2002 (KR) .................................. 10-2002-20134

(51) Int. Cl.⁷ ................................................. G06F 1/16
(52) U.S. Cl. ..................... 361/681; 361/683; 248/176.3
(58) Field of Search ................. 361/681–683, 361/684–687; 312/223.1, 223.2; 345/1.1, 30; 16/239, 306, 330–334, 337–341, 368, 385, 918–922; 348/183, 228.1, 917, 923; 403/119–121, 83, 84, 95, 53, 57, 103, 146; 292/42, 145

(56) References Cited

U.S. PATENT DOCUMENTS

| | | | | |
|---|---|---|---|---|
| 5,016,849 A | * | 5/1991 | Wu | 248/176.3 |
| 5,206,790 A | * | 4/1993 | Thomas et al. | 361/681 |
| 5,335,142 A | * | 8/1994 | Anderson | 361/681 |
| 6,275,376 B1 | * | 8/2001 | Moon | 361/683 |
| 6,347,433 B1 | * | 2/2002 | Novin et al. | 16/367 |
| 6,498,721 B1 | * | 12/2002 | Kim | 361/681 |
| 6,549,789 B1 | * | 4/2003 | Kfoury | 455/550.1 |
| 6,587,333 B2 | * | 7/2003 | Tseng et al. | 361/681 |
| 6,654,233 B2 | * | 11/2003 | Tseng et al. | 361/681 |

FOREIGN PATENT DOCUMENTS

| | | | | |
|---|---|---|---|---|
| CN | 1251927 A | 5/2000 | | |
| CN | 1336595 A | 2/2002 | | |
| JP | 3-109621 | 5/1991 | | |
| JP | 3-161816 | 7/1991 | | |
| JP | 405242040 A | * | 9/1993 | .......... G06F/15/02 |
| KR | 10-284300 | 12/2000 | | |

* cited by examiner

Primary Examiner—Michael Datskovsky  
(74) Attorney, Agent, or Firm—Staas & Halsey LLP

(57) ABSTRACT

A portable computer having a main body generating a video signal, and an LCD assembly receiving the video signal from the main body and displaying a picture. The computer further having a hinge part including a hollow swiveling part extending toward the main body, and a pair of tilting parts radially extended from the swiveling part and rotatably connecting the LCD assembly and the main body; a rotation supporting part provided on the main body and rotatably supporting the swiveling part of the hinge part; and a video signal transmission member having a first end connected to the main body and a second end connected to the LCD assembly while being accommodated inside of the swiveling part of the hinge part and the rotation supporting part, and transmitting the video signal from the main body to the LCD assembly. With this configuration, the portable computer is capable of tilting and swiveling an LCD assembly, has a simple tilting and swiveling structure because of hollow tilting and swiveling parts formed as a single body, has a compact cable accommodating structure, and is capable of firmly keeping the LCD assembly at a desired angle.

16 Claims, 4 Drawing Sheets

PORTABLE COMPUTER

CROSS-REFERENCE TO RELATED APPLICATIONS

This application claims the benefit of Korean Application No. 02-20134, filed Apr. 12, 2002, in the Korean Industrial Property Office, the disclosure of which is incorporated herein by reference.

BACKGROUND OF THE INVENTION

1. Field of the Invention

The present invention relates in general to a portable computer, and more particularly, to a portable computer which has an LCD assembly capable of tilting and swiveling.

2. Description of the Related Art

Generally, a portable computer comprises a main body including a main board mounted with a central processing unit, a graphic chip, etc., and an input unit, and an LCD (liquid crystal display) assembly displaying a picture based on input data.

The portable computer is used with its LCD assembly in an opened position. Oppositely, when the portable computer is not used or when the portable computer is carried, the portable computer is kept in a folded position. That is, in the conventional portable computer, the LCD assembly is rotated up and down against the main body in a tilting movement.

Further, in the conventional portable computer, the LCD assembly can be rotated laterally against the main body in a swiveling movement. Therefore, it is not necessary to turn the whole portable computer laterally.

However, in the conventional portable computer, a tilting part and a swiveling part are independent of each other, and it is hard for the tilting and swiveling parts to accommodate an LCD-FPC (flexible printed circuit) cable or an optical cable which connects the main body with the LCD assembly and transmits a video signal from the main body to the LCD assembly. Therefore, it is not easy to assemble the portable computer.

Further, in the conventional portable computer, there is provided stoppers such as a projection in order to hold the LCD assembly at a predetermined swiveling-angle. However, the LCD assembly can be arbitrarily swiveled in a rotation section between the stoppers, so it is difficult to hold the LCD assembly firmly at a desired angle. Therefore, it is difficult to apply the swiveling unit to a portable computer employing a touch-screen system.

SUMMARY OF THE INVENTION

Accordingly, it is an object of the present invention to provide a portable computer which has a simple tilting and swiveling unit for an LCD assembly, and a compact cable accommodating structure, and is capable of firmly keeping the LCD assembly at a desired angle.

Additional objects and advantages of the invention will be set forth in part in the description which follows and, in part, will be obvious from the description, or may be learned by practice of the invention.

The above and other objects of the present invention may be accomplished by providing a portable computer having a main body generating a video signal, and an LCD assembly receiving the video signal from the main body and displaying a picture, comprising: a hinge part including a hollow swiveling part extended toward the main body, and a pair of tilting parts radially extending from the swiveling part and rotatably connecting the LCD assembly and the main body; a rotation supporting part provided in the main body and rotatably supporting the swiveling part of the hinge part; and a video signal transmission member having a first end connected to the main body and a second end connected to the LCD assembly while being accommodated inside of the swiveling part of the hinge part and the rotation supporting part, and transmitting the video signal from the main body to the LCD assembly.

In an aspect of the present invention, the rotation supporting part includes a hollow main part placed in a through hole formed on a rear upper surface of the main body; and a flange part radially extending from the lower part of the main part and combined to the back of the through hole.

In another aspect of the present invention, the video signal transmission member includes at least one of an LCD-FPC (flexible printed circuit) cable and an optical cable.

In yet another aspect of the present invention, the portable computer further comprises a friction member provided between the rotation supporting part and the swiveling part, and resisting swiveling of the LCD assembly. The friction member includes a hollow plate spring, and the video signal transmission member passes through the plate spring.

In yet another aspect of the present invention, the portable computer further comprises a breakaway-preventive member provided in the lower part of the rotation supporting part and combined to the lower part of the swiveling part so as to prevent the swiveling part of the hinge part from breaking away upwardly from the rotation supporting part, wherein the breakaway-preventive member has a ring shape and the video signal transmission member passes through the breakaway-preventive member.

In yet another aspect of the present invention, the LCD assembly comprises: an LCD panel receiving the video signal from the main body and displaying a picture thereon; a rear cover placed in the rear of the LCD panel; a hinge accommodating part provided in the lower front part of the rear cover, and rotatably accommodating the tilting part of the hinge part; a front cover connected to the rear cover with the LCD panel being located therebetween so as to support the LCD panel, and formed with a cut part corresponding to the hinge accommodating part in the lower front part thereof; and a shield cover removably combined to the cut part, and covering the tilting part of the hinge part accommodated in the hinge accommodating part.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE PREFERRED EMBODIMENT

Figure 1:
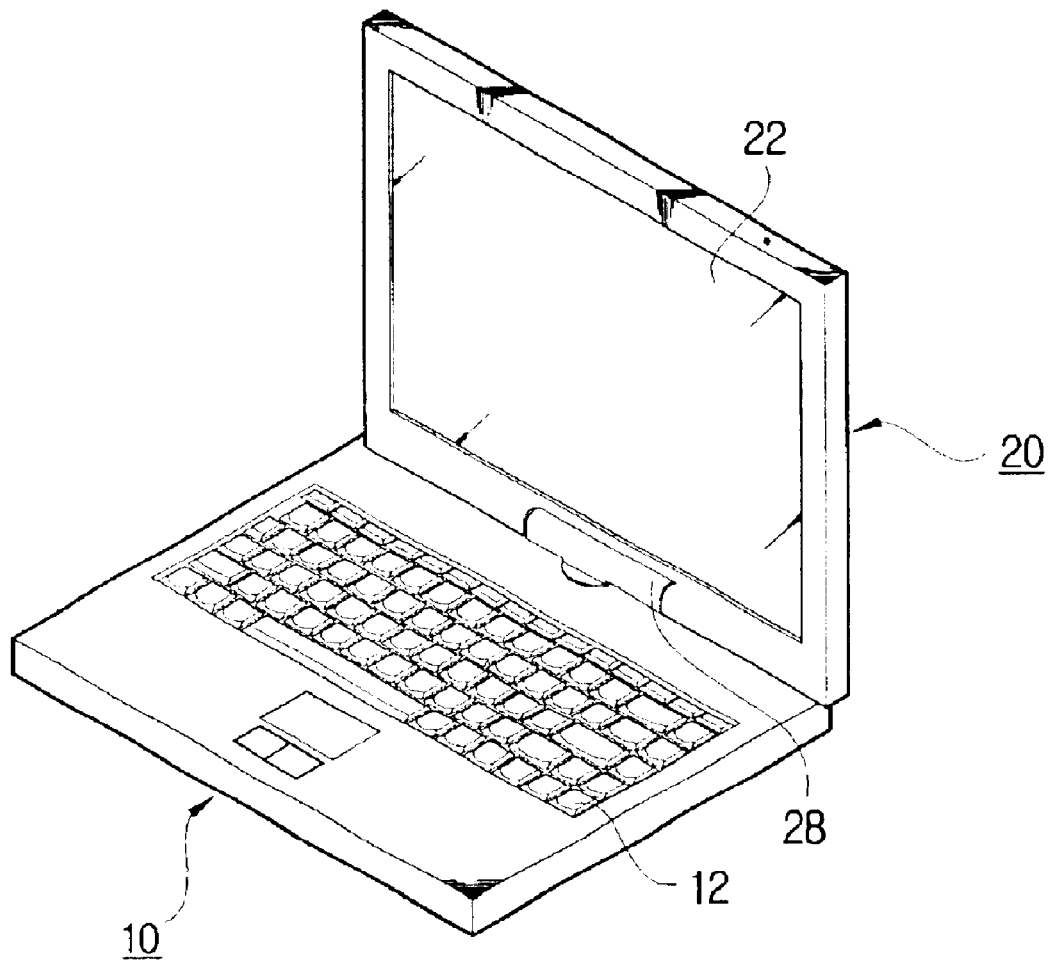
FIG. 1 is a perspective view of a portable computer according to an embodiment of the present invention, illustrating tilting of an LCD assembly thereof.

Reference will now be made in detail to the embodiments of the present invention, examples of which are illustrated in the accompanying drawings, wherein like reference numerals refer to like elements throughout. The embodiments are described below in order to explain the present invention by referring to the figures.

In a portable computer according to an embodiment of the present invention, an LCD assembly 20 is not only tilted (refer to FIG. 1) but also swiveled (refer to FIG. 2) against the main body 10.

Figure 3:
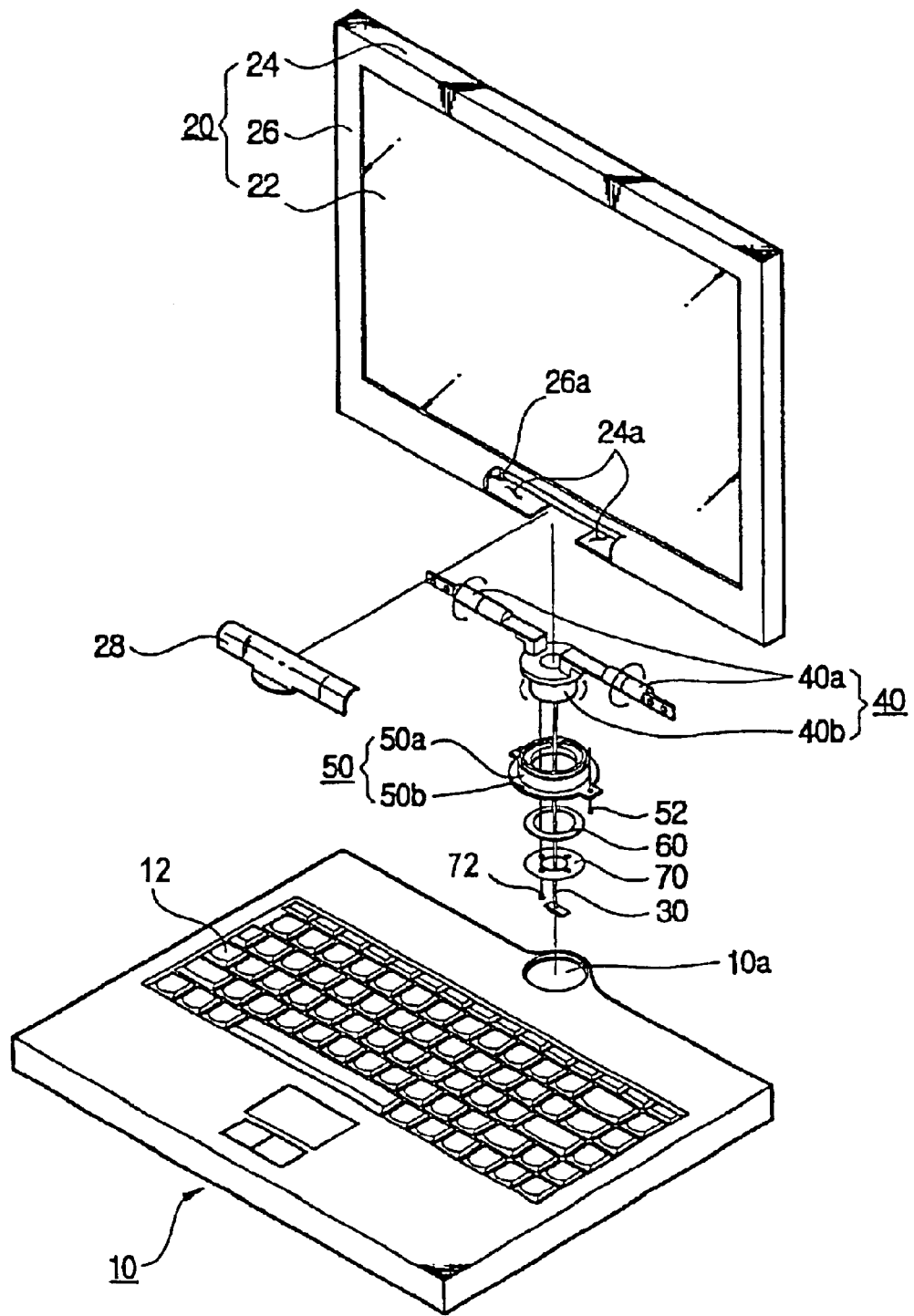
FIG. 3 is a partially exploded perspective view of the portable computer of FIG. 1.
Figure 4:
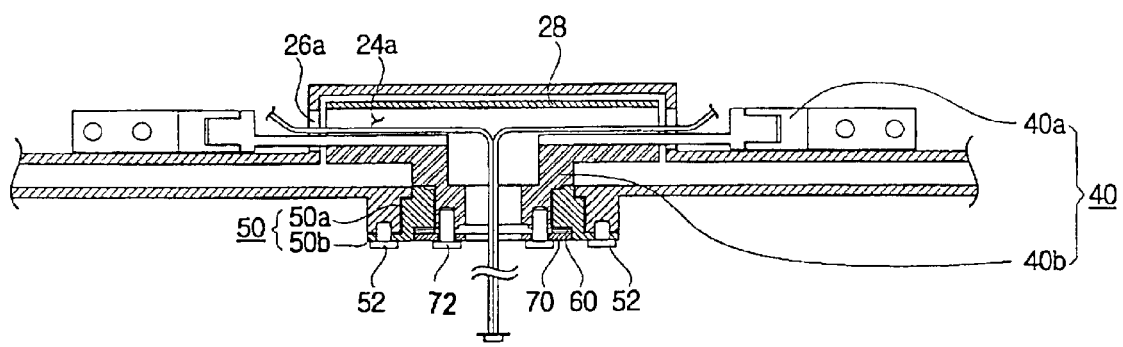
FIG. 4 is an enlarged section view of an assembled state of the portable computer of FIG. 3.

The portable computer according to the present invention, as illustrated in FIGS. 3 and 4, comprises the main body 10 generating a video signal, and the LCD assembly 20 receiving the video signal from the main body 10 and displaying a picture.

The main body 10 includes a main board (not shown) mounted with a central processing unit, a graphic chip, etc., and an input unit 12 such as a keyboard, a mouse, etc. A video signal generated from data inputted by the input unit 12 is transmitted to the LCD assembly 20 through a video signal transmission member 30, and is displayed on an LCD panel 22.

The video signal transmission member 30 includes at least one of an LCD-FPC (flexible printed circuit) cable and an optical cable. In order to prevent the video signal transmission member 30 from twisting due to tilting and swiveling of the LCD assembly 20, the video signal transmission member 30 from the main body 10 is connected to the LCD panel 22, being accommodated inside of a breakaway-preventive member 70, a friction member 60, a rotation supporting part 50, and a swiveling part 40b of a hinge part 40 (refer to FIG. 4).

The LCD assembly 20 includes the LCD panel 22 displaying a picture thereon, and a front cover 26 and a rear cover 24 connected to each other with the LCD panel 22 being located therebetween and supporting the LCD panel 22.

In the lower front part of the rear cover 24 a hinge accommodating part 24a partially accommodating a tilting part 40a of the hinge part 40 is provided, and in the lower front part of the front cover 26 a cut part 26a corresponding to the hinge accommodating part 24a is formed. Further, a shield cover 28, covering the tilting part 40a accommodated in the hinge accommodating part 24a, is removably connected to the cut part 26a.

The hinge part 40 and the rotation supporting part 50 are provided between the LCD assembly 20 and the main body 10, to thereby support tilting and swiveling of the LCD assembly 20 against the main body 10.

The hinge part 40 includes the hollow swiveling part 40b extending toward the main body 10, and the pair of tilting parts 40a extending radially from the swiveling part 40b and rotatably connected to the hinge accommodating part 24a of the rear cover 24.

Herein, the tilting part 40a and the swiveling part 40b may be formed as a single body, thereby simplifying the tilting and swiveling structure.

The rotation supporting part 50 includes a hollow main part 50a placed in a through hole 10a formed on the rear upper surface of the main body 10 and accommodating the swiveling part 40b therein, and a flange part 50b radially extending from the lower part of the main part 50a and connected to the back of the through hole 10a by means of a screw 52.

Thus, the rotation supporting part 50 is inserted in the through hole 10a formed on the rear upper surface of the main body 10, and the hinge part 40 is connected to the LCD assembly 20. Thereafter, the swiveling part 40b of the hinge part 40 is inserted in the main part 50a of the rotation supporting part 50. Then, the LCD assembly 20 can be tilted by the pair of tilting parts 40a serving as a hinge, and can be swiveled by the swiveling part 40b inserted in the main part 50a.

On the other hand, if the LCD assembly 20 is arbitrarily swiveled against the main body 10, it is not handy for a user to swivel the LCD assembly 20, and it is difficult to hold the LCD assembly 20 at a desired angle. Accordingly, according to the present invention, there is provided the friction member 60 between the rotation supporting part 50 and the swiveling part 40b, which resists swiveling of the LCD assembly 20.

The friction member 60 includes a plate spring having a doughnut shape. However, the friction member 60 may include soft rubber, sponge, etc. Like the swiveling part 40b of the hinge part 40 and the main part 50a of the rotation supporting part 50, the friction member 60 should have a hollow shape to accommodate the video signal transmission member 30 therein. At this time, the plate spring has the modulus of elasticity enough to prevent the LCD assembly 20 from arbitrarily swiveling.

Further, there is provided the breakaway-preventive member 70 on the lower part of the rotation supporting member 50, which is connected to the lower part of the swiveling part 40b inserted in the main part 50a of the rotation supporting part 50 by a screw 72 and prevents the swiveling part 40b of the hinge part 40 breaking away upwardly from the main part 50a of the rotation supporting part 50. Herein, the breakaway-preventive member 70 has a ring shape, thereby allowing the video signal transmission member 30 to pass therethrough.

With this configuration, the portable computer according to the present invention is assembled as follows. First, the shield cover 28 is removed from the front cover 26, and the pair of tilting parts 40a is rotatably accommodated in the hinge accommodating part 24a of the rear cover 24, and then the shield cover 28 is connected to the cut part 26a of the front cover 26.

Thereafter, the main part 50a of the rotation supporting part 50 is inserted in the through hole 10a of the main body 10, and the flange part 50b, radially extending from the main part 50a, is connected to the back of the through hole 10a by the screw 52. After the hinge part 40 and the rotation supporting part 50 are connected to the LCD assembly 20 and the main body 10, respectively, the swiveling part 40b of the hinge part 40 combined to the LCD assembly 20 is inserted in the main part 50a of the rotation supporting part 50 connected to the main body 10. Thereafter, the friction member 60 is positioned on the lower part of the rotation supporting part 50, and then the breakaway-preventive member 70 is connected to the swiveling part 40b by the screw 72 across the rotation supporting part 50 and the friction member 60, thereby connecting the hinge part 40 and the rotation supporting part 50.

At this time, the video signal transmission member 30 connects the main body 10 and the LCD panel 22, while being accommodated inside of the breakaway-preventive member 70, the friction member 60, the main part 50a of the rotation supporting part 50, and the swiveling part 40b of the hinge part 40.

Figure 2:
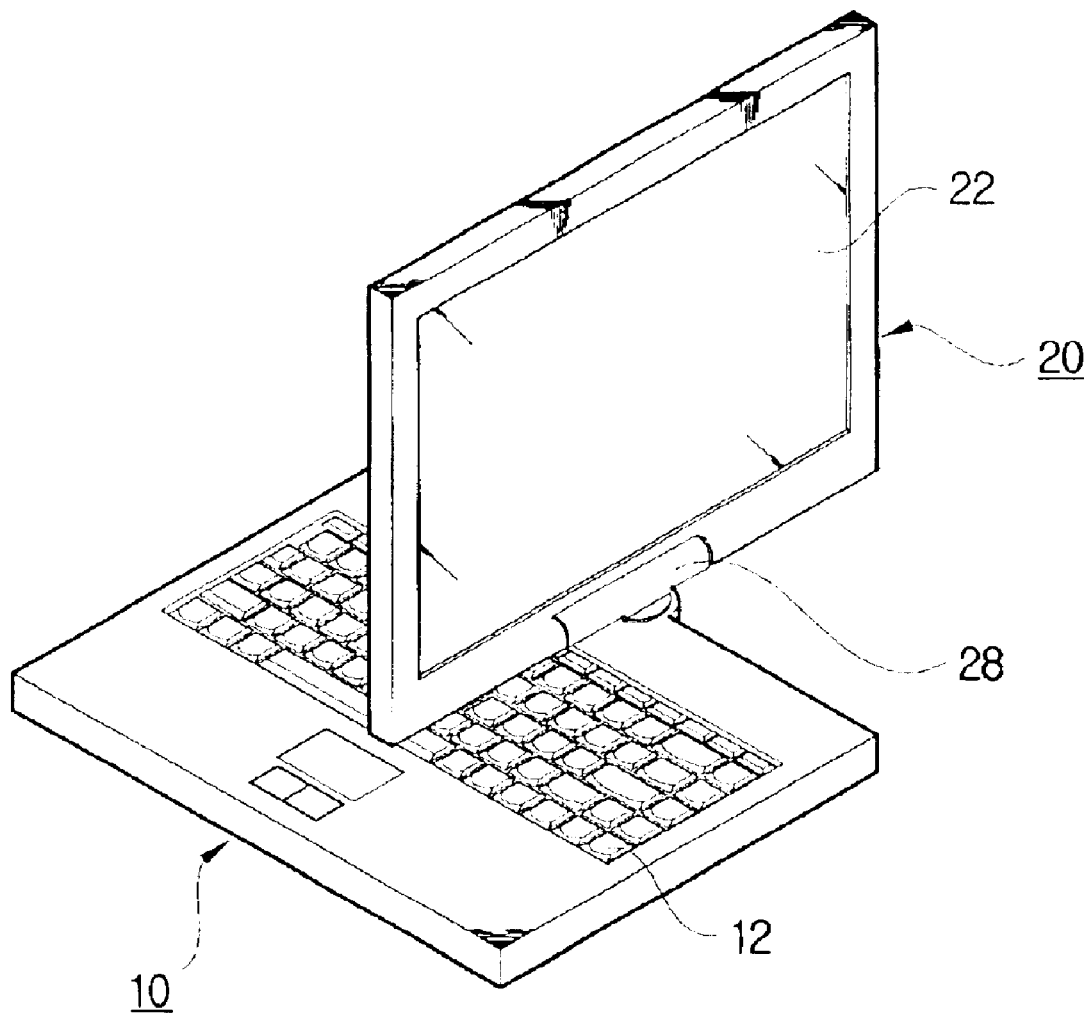
FIG. 2 is a perspective view of the portable computer of FIG. 1, illustrating swiveling of the LCD assembly.

Accordingly, as the portable computer is completely assembled, tilting of the LCD assembly 20 is, as illustrated in FIG. 1, allowed by the pair of tilting parts 40a serving as a hinge, and swiveling of the LCD assembly 20 is, as illustrated in FIG. 2, allowed by the swiveling part 40b of the hinge part 40 inserted in the main part 50a of the rotation supporting part 50.

As described above, the present invention provides a portable computer capable of tilting and swiveling an LCD assembly, which has a simple tilting and swiveling structure provided by hollow tilting and swiveling parts formed as a single body, and a compact cable accommodating structure, and is capable of firmly keeping the LCD assembly at a desired angle.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable computer having a main body generating a video signal, and an LCD assembly receiving the video signal from the main body and displaying a picture, comprising:
    a hinge part including a hollow swiveling part extending toward the main body, and a pair of tilting parts radially extending from the swiveling part and rotatably connecting the LCD assembly and the main body;
    a rotation supporting part provided on the main body and rotatably supporting the swiveling part of the hinge part;
    a friction member provided between the rotation supporting part and the hollow swiveling part, and resisting swiveling of the LCD assembly; and
    a video signal transmission member transmitting the video signal from the main bad to the LCD assembly, having a first end connected to the main body and a second end connected to the LCD assembly and being accommodated inside of the friction member, the swiveling part of the hinge parts and the rotation supporting part.

2. A portable computer having a main body generating a video signal, and an LCD assembly receiving the video signal from the main body and displaying a picture, comprising:
    a hinge part including a hollow swiveling part extending toward the main body, and a pair of tilting parts radially extending from the swiveling part and rotatably connecting the LCD assembly and the main body;
    a rotation supporting part provided on the main body and rotatably supporting the hollow swiveling part of the hinge part; and
    a video signal transmission member having a first end connected to the main body and a second end connected to the LCD assembly while being accommodated inside of the swiveling part of the hinge cart and the rotation supporting part, and transmitting the video signal from the main body to the LCD assembly,
    wherein the rotation supporting part includes:
        a hollow main part placed in a through hole formed on a rear upper surface of the main body, and
        a flange part radially extending from the lower part of the main part and connected to the back of the through hole.

3. The portable computer according to claim 1, wherein the video signal transmission member includes at least one of an LCD-FPC (flexible printed circuit) cable and an optical cable.

4. The portable computer according to claim 1, wherein the friction member includes a hollow plate spring, and the video signal transmission member passes through the plate spring.

5. The portable computer according to claim 4, further comprising a breakaway-preventive member provided on the lower part of the rotation supporting part and connected to the lower part of the hollow swiveling part so as to prevent the swiveling part of the hinge part from breaking away from the rotation supporting part, wherein the breakaway-preventive member has a ring shape and the video signal transmission member passes through the breakaway-preventive member.

6. A portable computer having a main body generating a video signal, and an LCD assembly receiving the video signal from the main body and displaying a picture, comprising:
    a hinge part including a hollow swiveling part extending toward the main body, and a pair of tilting parts radially extending from the swiveling part and rotatably connecting the LCD assembly and the main body;
    a rotation supporting part provided on the main body and rotatably supporting the hollow swiveling part of the hinge part; and
    a video signal transmission member having a first end connected to the main body and a second end connected to the LCD assembly while being accommodated inside of the swiveling part of the hinge part and the rotation supporting part, and transmitting the video signal from the main body to the LCD assembly,
    wherein the LCD assembly includes:
        an LCD panel receiving the video signal from the main body and displaying a picture thereon;
        a rear cover placed in the rear of the LCD panel;
        a hinge accommodating part provided in a lower front part of the rear cover, and rotatably accommodating the tilting part of the hinge part;
        a front cover connected to the rear cover with the LCD panel being located therebetween so as to support the LCD panel, and formed with a cut part corresponding to the hinge accommodating part in the lower front part thereof; and
        a shield cover removably connected to the cut part, and covering the tilting part of the hinge part accommodated in the hinge accommodating part.

7. The portable computer according to claim 1, wherein the hinge part is positioned between said LCD assembly and said main body.

8. The portable computer according to claim 1, wherein the tilting part and the swiveling part are formed as a single body.

9. The portable computer according to claim 2, wherein the rotation supporting part is inserted in a through hole formed on a rear upper surface of the main body, and the hinge part is connected to the LCD assembly.

10. The portable computer according to claim 9, wherein the swiveling part of the hinge part is inserted in the hollow main part of the rotation supporting part.

11. The portable computer according to claim 4, wherein the friction member is formed of one of soft rubber and sponge having a modulus of elasticity enough to prevent the LCD from arbitrarily swiveling.

12. A portable computer having a main body and an LCD assembly, the portable computer comprising:
    a hinge part comprising
        a swiveling part, and a tilting part radially extending from the swiveling part and rotatably connecting the LCD assembly and the hinge part;

a rotation supporting part connected with the main body and rotatably supporting the swiveling part;

a friction member disposed between the rotation supporting part and the swiveling part and resisting rotation of the swiveling part; and a video signal transmission member connected with the main body and the LCD assembly and accommodated within the friction member, the rotation supporting part, and the swiveling part.

13. The portable computer according to claim 12, further comprising:

a breakaway-preventive member connected with the swiveling part and preventing the swiveling part from separating from the rotation supporting part, wherein the video signal transmission member is also accommodated within the breakaway-preventive member.

14. The portable computer according to claim 12, wherein the rotation supporting part comprises:

a main part rotatably supporting the swiveling part; and a flange part radially extending from the main part and connected with the main body.

15. The portable computer according to claim 12, wherein the tilting part and the swiveling part are integrally formed.

16. A portable computer having a main body and an LCD assembly having a hinge accommodating part and a front panel with a cut part corresponding with the hinge accommodating part, the portable computer comprising:

a hinge part comprising a swiveling part, and a tilting part, radially extending from the swiveling part, accommodated within the accommodating part, and rotatably connecting the LCD assembly and the hinge part;

a rotation supporting part connected with the main body and rotatably supporting the swiveling part; and a shield cover removably connected with the cut part, and covering the tilting part.

* * * * *

UNITED STATES PATENT AND TRADEMARK OFFICE
CERTIFICATE OF CORRECTION

PATENT NO. : 6,867,961 B2
DATED : March 15, 2005
INVENTOR(S) : Phil-kyu Choi

It is certified that error appears in the above-identified patent and that said Letters Patent is hereby corrected as shown below:

Column 5,
Line 33, change "bad" to -- body --;
Line 35, after "assembly" insert -- , --;
Line 37, change "parts" to -- part, --; and
Line 53, change "cart" to -- part --.

Signed and Sealed this

Tenth Day of January, 2006

JON W. DUDAS
*Director of the United States Patent and Trademark Office*